United States Patent

Pinkham

[15] 3,665,101

[45] May 23, 1972

[54] SWITCHING APPARATUS FOR EACH STYLUS OF A MULTISTYLII FACSIMILE RECORDER

[72] Inventor: Roger A. Pinkham, Lake Hiawatha, N.J.

[73] Assignee: EG&G, Inc., Bedford, Mass.

[22] Filed: Dec. 7, 1970

[21] Appl. No.: 95,844

[52] U.S. Cl. ....................178/6.6 R, 346/74 E, 346/74 ES, 346/139 A

[51] Int. Cl. ....................G01d 15/06, H04n 1/14, H04n 1/24

[58] Field of Search ....................178/6.6 R, 6.6 A, 7.6; 346/74 E, 74 ES, 139 A, 35

[56] References Cited

UNITED STATES PATENTS

| | | | |
|---|---|---|---|
| 2,625,458 | 1/1953 | Ruhland | 346/139 A |
| 3,108,845 | 10/1963 | Zabriskie | 346/139 A |
| 3,581,001 | 5/1971 | Sobchak | 178/7.6 |

*Primary Examiner*—Howard W. Britton
*Attorney*—Ralph L. Cadwallader and Leo M. Kelly

[57] ABSTRACT

A switching apparatus is provided whereby the marking action of each stylus of a multistylii facsimile recorder may be observed separately from the marking action of the other stylii. Switching means makes it possible to block the marks of any one or all of the stylii so that in the event any stylus is making a mark out of alignment such stylus may be detected and adjustment made thereof.

10 Claims, 2 Drawing Figures

INVENTOR.
ROGER A PINKHAM
BY Edward [illegible]
Attorney

SWITCHING APPARATUS FOR EACH STYLUS OF A MULTISTYLII FACSIMILE RECORDER

BACKGROUND OF THE INVENTION

Facsimile systems usually include a transmitter at one location and a recorder at a spaced location connected to the transmitter by a wire or radio system. The transmitter provides a line-by-line dissection of the image of a document or photograph to be transmitted between the transmitter and the recorder. The image dissector includes a drum carrying a helical light slit which is rotatable past a fixed support carrying a straight light slit. The copy is illuminated as it is moved through the transmitter and light reflected from the copy is passed through the image dissector to a photoelectric device for conversion to an analogue type electric video signal which is transmitted to the receiver.

At the receiver a read out device converts the video signal to copy. The read out device preferably includes a plurality of stylii equally spaced on supporting means which carries the stylii transversely across a strip of recording medium while the recording medium is simultaneously moved lengthwise. The video signals are sequentially applied to each stylus as it moves across the surface of the recording medium.

Electrostatic recording paper is preferably used as the recording medium. In the recording operation the electric video signal is applied to the recorder stylii through appropriate circuitry. The stylii in a preferred embodiment are carried by a belt in equally spaced relationship. The belt is rotated at a speed such that each stylus crosses the face of the paper and marks the paper in accordance with the information in the video signal. The recording medium is continuously moved lengthwise so that the next stylus marking the next line of the recording medium has a fresh space for marking.

It is quite obvious that good copy will result only in the event each of the stylii is mechanically positioned on the belt so that the mark produced by each starts at the same distance from the edge of the recording medium or paper. For example, in the event the copy has a vertical line defining the lefthand margin thereof this line must be reproduced in the recorder as a straight line rather than as a series of dots randomly positioned to the left or the right of the optimum position. Alignment of the stylii is generally accomplished by mechanical movement thereof. It is necessary to ascertain which stylus is out of line, stop the recorder, make the appropriate adjustment, and restart the recorder. Inasmuch as the stylii are carried on a rotatable supporting means difficutly has been had in ascertaining which of the stylii are producing a certain mark. The present invention aims to overcome this difficulty by providing a switching apparatus operative so that any one or more of the stylii may be switched off during the operation of the recorder. Accordingly, if a vertical line is transmitted to the recorder, and it is noted that the elements forming the line are not in exact order, the switching apparatus in accordance with the invention may be operated so that the various stylii are switched out of operation and the improperly adjusted stylus may be quickly detected.

SUMMARY OF THE INVENTION

In accordance with the invention a switching apparatus is provided incorporating means for producing a marking signal, a blocking circuit is provided for the marking signal controlled by a shift register, and pulsing means controlled by rotatable movement of the stylii is provided, so that as each stylus mechanically approaches the marking position the switching means is energized to pulse the shift register and the output thereof controls the blocking circuit for the entire line of scan. Manual switching means controls the blocking circuit so that one, all, or any combination of the stylii may be prevented from marking.

DESCRIPTION OF THE PREFERRED EMBODIMENT

Figure 1:
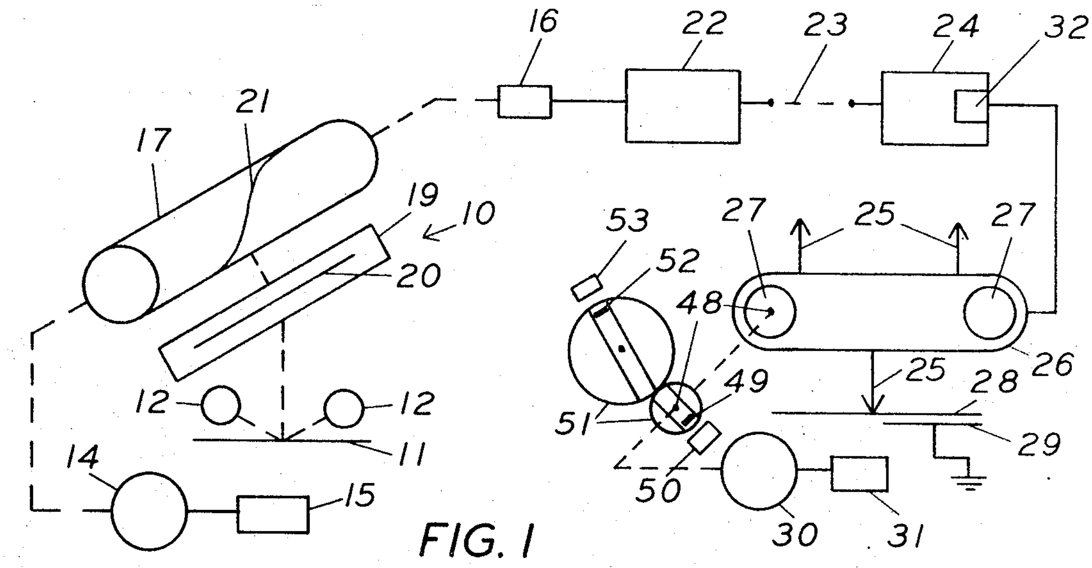
FIG. 1 is a schematic diagram illustrating a facsimile transmitter and receiver and including a circuit in accordance with the invention as part of the receiver electronics.

Referring to the drawings there is shown in FIG. 1 a facsimile transmitter 10 with a piece of copy such as a document or photograph 11 being moved past a pair of viewing lights 12 by a motor 14 operated by a control 15. Interposed between the copy 11 and a photoelectric device 16 is a light dissector including a rotatable helix drum 17 and a fixed member 19 having a straight narrow light path 20 positioned thereon. The rotatable drum 17 has a helical light path 21 adapted to cooperate with the light path 20 so that light reflected from the copy 11 is passed to the interior of the helix drum 17 in a line-by-line image dissection manner. The helix drum 17 may be rotated by the motor 14 or may be driven separately by another motor drive. The light passed to the interior of the helix drum 17 is picked up by the photoelectric device 16 and passed through the usual transmitter electronics 22 and a transmission line 23 to usual recorder electronics 24. The output is passed to one or more euqally spaced stylii 25 carried by a belt 26 passed over a pair of rollers or pulleys 27. A suitable recording medium 28, preferably electrostatic paper, is moved past the transverse path of the stylii 25 and over a grounded platen 29 by a motor 30 powered by a supply 31. The recording medium 28, if electrostatic paper, is then passed through a toner as is well known in the art.

In the operation of the facsimile device the copy 11 is passed by the lamps 12 so that light is reflected through the straight line path and helical line path in series to the interior of the helix drum 17. This light is picked up by the photoelectric device 16 and converted to an analog signal which is passed through transmitter electronics 22, transmission line 23 and recorder electronics 24 to one of the stylii 25. The electronics is such that a mark is made on the copy medium by the stylii 25 corresponding to a mark viewed by the image dissector drum 17.

Figure 2:
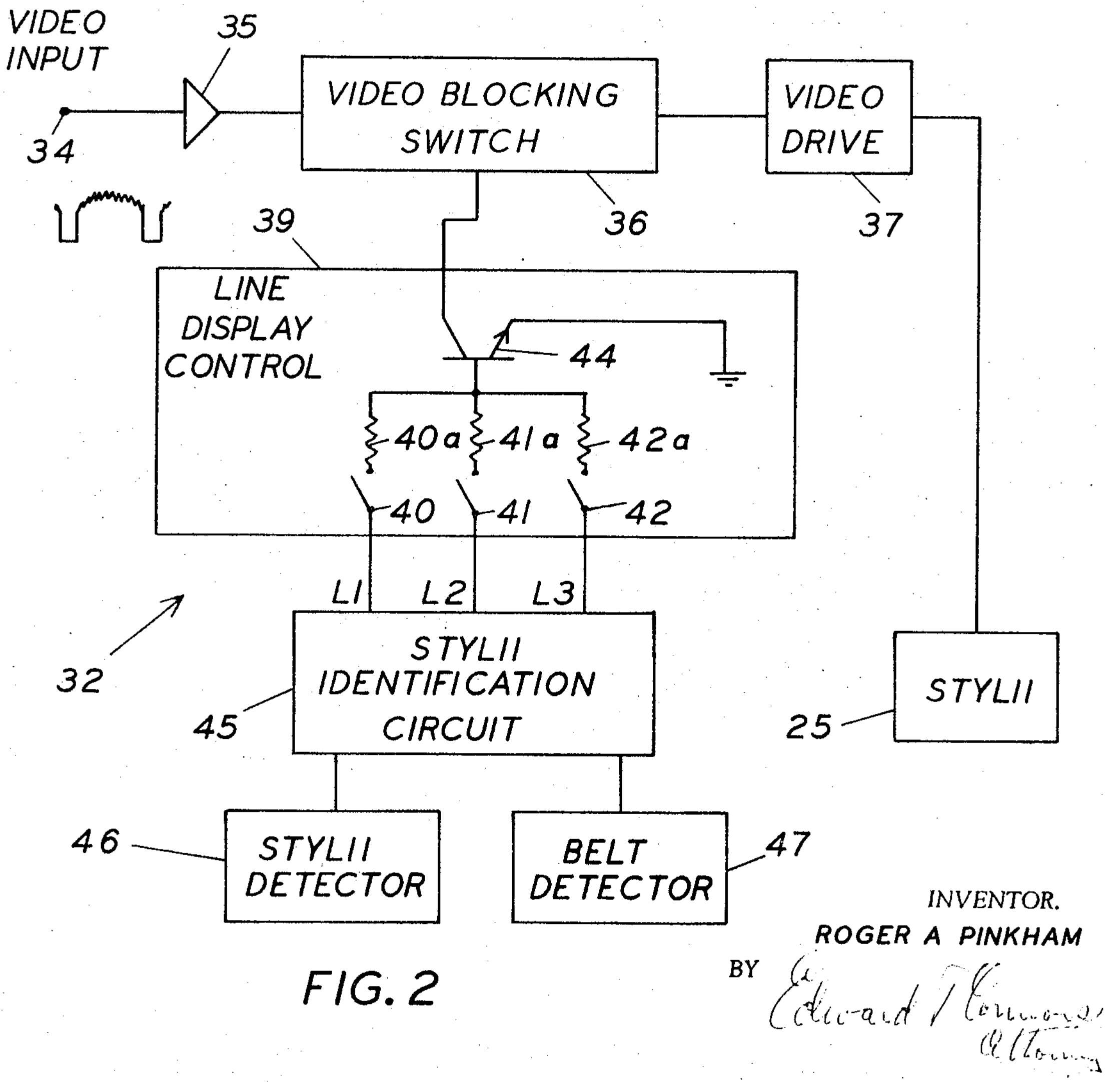
FIG. 2 is a block diagram illustrating the apparatus in accordance with the invention.

The circuit 32 shown in block diagram in FIG. 2 is incorporated as a poartion of the recorder electronics of FIG. 1. As stated above the purpose of the circuit is to provide means to switch off one or more of the stylii so as to prevent it from marking in order that observation may be had as to which of the stylii is out of alignment so that appropriate mechanical correction may be had. The circuit 32 is supplied by a video input 34 through an amplifier 35 to a video blocking switch 36 and a video drive or amplifier 37 to the stylii 25. Copy 11 is supplied to the transmitter so as to provide a marking signal in the form of a plurality of vertical lines extending across the copy.

The blocking means 36 may include suitable switching means which is arranged to prevent the signal received in the input terminal 34 from being passed to the stylii 25, and may, for example, take the form of a grounding switch such as a transistor or the like. The video blocking switch 36 is controlled by a line display control 39 incorporating a switch for each of the stylii. For example, if the recorder is provided with three stylii then three switches 40, 41 and 42 would be provided in the line display control 39. These switches connect resistors 40*a*, 41*a*, and 42*a* in the base circuit of a transistor 44 having its emitter connected to ground and arranged with suitable circuitry to control the video blocking switch 36. Other conventional circuits may be substituted for the transistor 44. The blocking effect continues for the entire line of scan.

The inputs for the line display control 39 are supplied by a shift register 45 which may be called a stylus identification circuit and which has a plurality of outlets each connected to one of the switches 40, 41, and 42, The shift register 45 is switched by a stylus detector 46 and reset by a belt detector 47.

The stylus detector 46 may be any switching means adapted to produce a pulse responsive to the passage of the stylii past a fixed point. Conveniently in the event the belt 26 is rotated by pulley 27 carried by a shaft 48 and so designed that the pulley makes three revolutions of the belt 26, a magnetic slug 49 may be carried by the pulley shaft 48 and passed by a reed switch 50 fixed on the frame. Suitable pulsing means in the stylus detector 46 will be switched by the reed switch 50. The rotation of the pulley 27 will control the output of the stylus detector 46 so that a pulse is produced for each rotation of the pulley 27 and, of course, it will be produced when one of the stylii is in a fixed marking position. Suitable adjustment of the magnetic slug 49 is made so that the pulse is produced shortly after the stylus 25 has passed the edge of the recording paper.

In order to provide control means for the belt detector or reset 47 a suitable reduction gear means 51 is provided controlled by shaft 48 of pulley 27. The gear reduction means 51 also carries a magnetic slug 52 cooperating with another reed switch 53 to control the belt detector or reset 47 so that a reset pulse is given to the shift register 45 for each rotation of the belt 26.

In the operation of the circuit 32 when a marking signal is received in the video input 34 it is passed through the blocking switch 36, through the video drive 37 to the stylii 25 to mark the recording medium 28. As the belt 26 is rotated the magnetic slug 49 is carried past the reed switch 50 to switch the shift register 45. One or more of the switches 40, 41, or 42 may be closed manually thereby closing the transistor 44 so that the video blocking switch 36 is operative each time a signal is received at the stylii corresponding to the switch 40, 41, or 42. The operation of the various stylii may be observed by the mark produced on the copy 28. In the event a certain stylus is found to be out of adjustment the recorder is stopped and a mechanical adjustment is made to the stylus.

While the invention has been described and illustrated with reference to a specific embodiment thereof it will be understood that other embodiments may be resorted to without departing from the invention. Therefore, the invention set out above should be considered as illustrative and not as limiting the scope of the following claims.

I claim:

1. A switching apparatus for each stylus of a multistylii facsimile recorder comprising means adapted to provide a marking signal, normally ineffective blocking means for said marking signal, a shift register, pulsing means for said shift register effective as each stylus approaches marking position in the facsimile recorder, reset means for said shift register effective after all of said multistylii have passed their respective marking positions, circuit means connecting said shift register for operating said blocking means, and switching means rendering said circuit means selectively ineffective.

2. A switching apparatus for each stylus of a multistylii facsimile recorder according to claim 1 in which said normally ineffective blocking means is a transistor connected to ground.

3. A switching apparatus for each stylus of a multistylii facsimile recorder according to claim 1 in which said shift register includes an input, a reset, and a plurality of outputs.

4. A switching apparatus for each stylus of a multistylii facsimile recorder according to claim 1 in which said normally ineffective blocking means is a transistor connected to ground, said pulsing means includes switching means, means rotatable with said stylii for controlling said switching means, and said reset means includes switching means, and means rotatable with said stylii for controlling said switching means.

5. A switching apparatus for each stylus of a multistylii facsimile recorder according to claim 1 in which said normally ineffective blocking means is a transistor connected to ground, said pulsing means includes switching means, means rotatable with said stylii for controlling said switching means, said reset means includes switching means, means rotatable with said stylii for controlling said switching means, and said means rotatable with said stylii includes a magnetic slug, and said switching means includes a reed switch.

6. A switching apparatus for each stylus of a multistylii facsimile recorder according to claim 1 in which said normally ineffective blocking means is a transistor connected to ground, said shift register includes an input, a reset, and a plurality of outputs, said pulsing means includes switching means, means rotatable with said stylii for controlling said switching means, said reset means includes switching means, means rotatable with said stylii for controlling said switching means, said means rotatable with said stylii includes a magnetic slug, said switching means includes a reed switch, and said means rotatable with said stylii includes speed reduction means and a magnetic slug carried by said speed reduction means, said switching means includes a reed switch.

7. A switching apparatus for each stylus of a multistylii facsimile recorder according to claim 1 in which said pulsing means includes switching means, and means rotatable with said stylii for controlling said switching means.

8. A switching apparatus for each stylus of a multistylii facsimile recorder according to claim 7 in which said means rotatable with said stylii includes a magnetic slug, and said switching means includes a reed switch.

9. A switching apparatus for each stylus of a multistylii facsimile recorder according to claim 1 in which said reset means includes switching means, and means rotatable with said stylii for controlling said switching means.

10. A switching apparatus for each stylus of a multistylii facsimile recorder according to claim 9 in which said means rotatable with said stylii includes speed reduction means and a magnetic slug carried by said speed reduction means, and said switching means includes a reed switch.

* * * * *